Aug. 14, 1934.  A. N. FLORA  1,969,790
COMBINATION INLET AND INJECTOR VALVE FOR WATER SOFTENERS AND THE LIKE
Filed Dec. 12, 1931
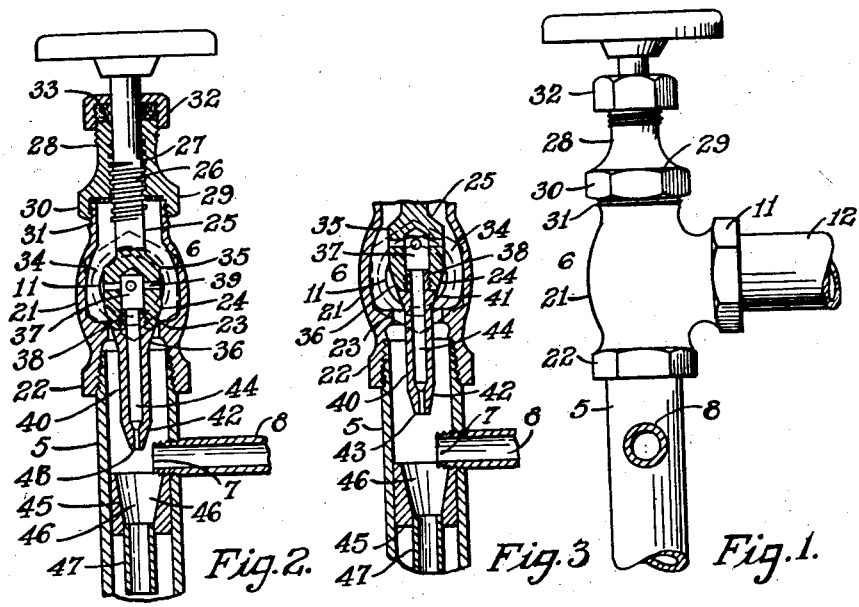
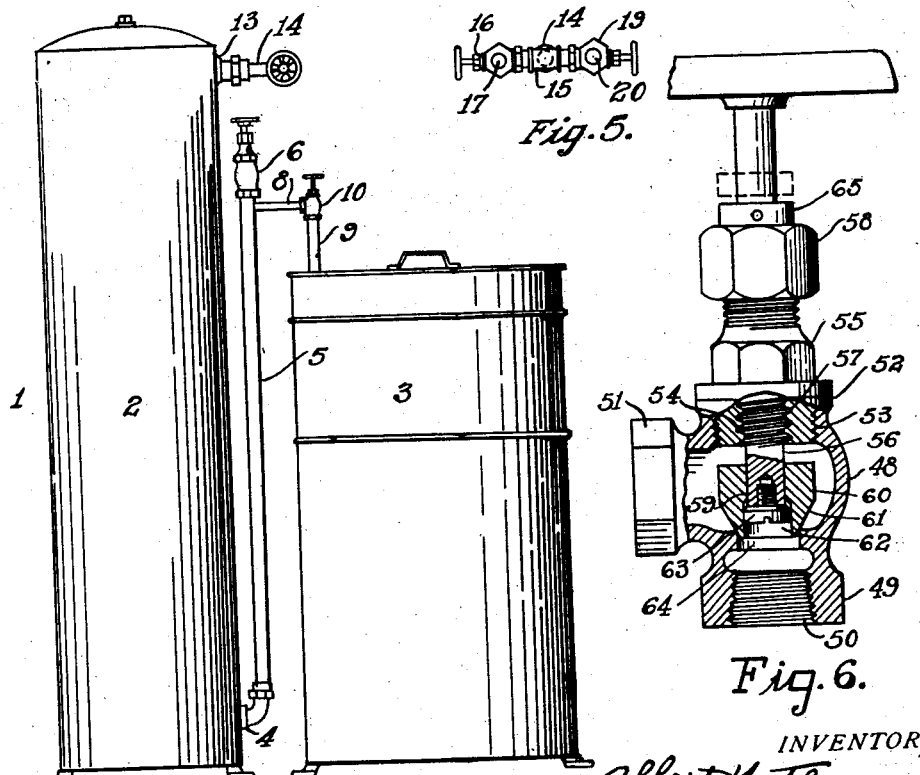
INVENTOR,
Albert N. Flora,
BY Howard S. Smith,
His ATTORNEY Patented Aug. 14, 1934

1,969,790

UNITED STATES PATENT OFFICE 1,969,790

COMBINATION INLET AND INJECTOR VALVE FOR WATER SOFTENERS AND THE LIKE

Albert N. Flora, Dayton, Ohio, assignor to Trupar Manufacturing Company, Dayton, Ohio, a corporation of Ohio Application December 12, 1931, Serial No. 580,645

3 Claims. (Cl. 103—262)

My invention relates to new and useful improvements in combination inlet and injector valves for water softeners and the like.

It is one of the principal objects of my invention to provide a combination inlet and injector valve through which, when closed, a brine solution is withdrawn from the brine tank of a water softener to recondition the latter; and when the valve is opened, the withdrawal of brine will be automatically discontinued and fresh water permitted to flow through the mineral bed until the brine is flushed out.

It is another object of my invention to provide in my injector valve restricted orifices, which, when the valve is in either position, will retard the liquid flow in order that the most beneficial results may be obtained during its passage through the mineral bed.

It is another important object of my invention to provide for use with my injector valve, an automatic valve in the brine suction line that has manual means for holding it open to permit the brine tank to be filled.

It is also another object of my invention to eliminate unnecessary valves and fittings and thus render a water softener equipped with my valve means, less costly in manufacture and simpler in operation.

Other important and incidental objects of my invention will be brought out in the following specification and particularly set forth in the subjoined claims.

In the accompanying drawing illustrating my invention, Figure 1 is a side view of my improved valve. Figure 2 is a sectional view, showing the valve in the closed position. Figure 3 is a partial sectional view, showing the valve in the open position. Figure 4 is a side elevation of a conventional water softener equipped with my valve. Figure 5 is a side view of the service and drain valve connections on the outlet connection of the softener. And Figure 6 is a detail view, partly in section, of my check valve.

Referring now to the accompanying drawing, for a detailed description of my invention, the numeral 1 indicates a conventional up-flow softener having a mineral tank 2 and a brine tank 3. Connected to a flange 4 at the bottom of the mineral tank and extending upwardly above the brine tank is an inlet pipe 5. (See Figure 4.)

Connected to the upper end of the pipe 5 is my combined injector and inlet valve 6 to be hereinafter more fully described; while immediately below the body of the valve 6, the inlet pipe 5 receives a lateral injector nozzle 7 formed on the end of the brine suction and refill pipe 8. The latter is connected with a vertical pipe 9 through a check valve 10 to be hereinafter described, and extends to the bottom of the brine tank 3.

My valve 6 receives in a threaded lateral port 11 a water supply connection 12. (See Figure 1.) Secured to a flange connection 13 at the top of the mineral tank 2 is an outlet connection 14 and T 15. (See Figures 4 and 5.)

Fitted to one end of the T 15 is an angle stop 16 in a drain line 17 to an outlet not shown. Fitted to the opposite end of the T 15 is another angle stop 19 in a supply line 20. (See Figures 4 and 5.)

My combination inlet and injector valve 6 will now be described. Integral with the lower end of a globe valve body is a hexagon shoulder 22 tapped to receive the inlet pipe 5. (See Figures 2 and 3.)

Within the body 21 above the tapped shoulder 22 is a valve seat 23 for a conical valve head 24. This valve head is an integral part of a valve stem 25 that is provided at its central part with square threads 26. These threads 26 are received by companion threads 27 in the neck 28 of a valve bonnet 29. This bonnet has a lower hexagonal shoulder 30, internally threaded to receive a threaded neck portion 31 of the valve body 21, while the upper reduced portion of the bonnet 29 is externally threaded to receive thereon a hexagonal gland nut 32. This gland nut is filled with packing 33 that surrounds the valve stem 25, and as the nut is tightened, the packing is compressed about the stem to prevent leakage. (See Figures 1, 2 and 3.)

Integral with the valve body 21 and communicating with the valve chamber 34 above the seat 23, is the lateral port 11 for the water supply connection 12.

The valve head 24 as shown in Figures 2 and 3 has an upper cylindrical body 35 where it joins the valve stem, and a lower conical end 36 to be received by the valve seat 23. The body 35 is provided with an axial recess 37 that is connected into a tapped hole 38 in the lower conical end 36 of the valve head 24. (See Figures 2 and 3.)

The recess 37 is provided with four equally spaced radial ports 39 of less diameter than the recess 37. The threaded hole 38 receives therein a depending nozzle extension 40, having a beveled shoulder 41 adjacent its upper threaded end to form a continuation of the conical end 36 of the valve head 24. (See Figures 2 and 3.)

The nozzle 40 has a lower conical end 42 that is provided with a small orifice 43 connected with a larger axial passage 44 communicating with the recess 37.

Secured within the inlet pipe 5 and at a short distance below the nozzle end 42, is a throat member 45, provided with a conical throat 46 on the axis of the pipe 5. Secured in the lower converging end of this throat 45 is an outlet tube 47 whose lower end discharges into the inlet pipe 5.

Extending radially into the pipe 5 and between the throat member 45 and the nozzle end 42 is the injector nozzle 7. (See Figures 2 and 3.)

This nozzle 7 is positioned within the pipe 5 so that when the valve head 24 is against the seat 23 as shown at Figure 2, fluid enters through the port 11, chamber 34, ports 39 and the recess 37 for discharge by the nozzle 40 into the throat 45. A vacuum then will be created in the nozzle 7 and the surrounding space within the pipe 5 to cause liquid to be drawn inwardly through the said injector nozzle. (See Figure 2.)

Now, when the valve 6 is opened as shown at Figure 3, the nozzle 42 will be raised above the injector nozzle 7. The valve head 24 is also raised above the seat 23, so that the fluid no longer passes through the nozzle 42 but from the chamber 34, through the valve 23, into the pipe 5, and through the throat 45, without creating a vacuum in the injector nozzle 7.

My check valve 10 will now be described. The valve 10 is especially adapted to be used in the suction line 8 in connection with my combination inlet and injector valve as a further means of controlling the liquid flow in the pipe 8. The valve as shown at Figure 6, has an angle globe body 48, a lower hexagonal shoulder 49 integral with the body that is provided with threads 50 to receive the pipe 9, and also a lateral hexagonal shoulder 51 likewise threaded to receive the pipe 8. (See Figures 4 and 6.)

The top of the valve body is provided with a flanged shoulder 52 and a threaded opening 53 to receive the lower threaded end 54 of a flanged valve cage 55 that is seated against the shoulder 52. This valve cage is of conventional construction and comprises a threaded valve stem 56 received by threads 57 in the cage 55 and a gland nut 58 adjustable upon the upper threaded end of the cage.

The lower end 59 of the valve stem is of lesser diameter than the threads 57, and receives slidably thereon a cylindrical valve head 60 whose lower conical end 61 is provided with a counterbore 62 that receives therein the head of a retainer screw 63 threaded into the lower end 59 of the valve stem. (See Figure 6.)

The valve 10 is adapted to be positioned with its stem vertical, as shown at Figure 6, and when in this position the valve head 60 will drop by gravity until its lower conical end 61 engages a circular valve seat 64 formed within the valve body 48 above the shoulder 49.

Now, when there is a sufficient vacuum in the tube 8, it will overcome the weight of the valve head and cause it to slide upwardly on the stem and the liquid will flow upwardly through the tubes 9 and 8.

If it is desired to open the valve manually to permit the liquid to flow in a reverse direction, as when it is desired to fill the brine tank, then the valve stem 56 is rotated and raised sufficiently until the head of the screw 63 engages the bottom of the counterbore 62 and lifts the valve head 60 from its seat 64.

Pinned upon the stem above the gland nut 58 is a collar 65 that engages the nut when the stem is in the proper lowered position, the valve being then adjusted to act as a check valve. When the valve is opened, the collar 65 will occupy the position as shown in dotted lines. (See Figure 6.)

It is thus seen that in valve mechanisms of simple construction I have provided an injector valve that is of particular value wherever it is desired to use a single fluid, or by closing that valve to form an injector to add a second fluid to the first fluid as required. This application is of special value in water softeners using a brine solution as a regenerating agent for the mineral bed, as shown at Figures 4 and 5. In this instance, the brine tank 3 contains a saturate solution of brine, and when it is desired to regenerate the softener, the supply line 20 is disconnected by closing the stop 19 and the stop 16 in the drain line 17 is opened. Now, by closing my combination drain and injector valve 6 and without opening the check valve 10 in the brine suction line 9, a brine solution will be drawn from the brine tank 3 and fed into the mineral tank 2 until a sufficient amount of brine has been withdrawn, or until the level of the liquid in the tank 3 drops to the lower bead on the tank. At this time the valve 6 is opened, whereupon fresh water will flow through the tube 5 and the mineral tank 2, through the drain line 17, to an outlet not shown. During this flushing operation the valve 10 will close automatically to prevent a back flow of the solution into the brine tank. This valve may be opened by raising the valve stem 56 to permit water to flow in a reverse direction through the pipe 9 until the level of the liquid in the brine tank 3 is brought up to the top bead on this tank, whereupon the valve 10 is then closed by lowering the valve stem until the collar 65 engages the gland nut 58.

When all of the brine solution has been flushed from the mineral tank, the drain valve 16 is closed and the supply valve 19 opened, placing the softener in service.

My combination inlet and injector valve, and co-operating automatic check valve, reduce the confusion often incident to the actuation of a multiplicity of valves during the reconditioning of the mineral bed of a water softener, by eliminating the operation of one valve.

I do not desire to be limited to the details of construction and arrangement herein shown and described, since any changes or modifications may be made therein within the scope of the subjoined claims.

Having described my invention, I claim:

1. A combination inlet and injector valve, comprising a hollow body having an inlet thereto for pressure fluid, a seat within the latter, a conical valve head of less diameter than the valve body, adapted to engage said seat, an operating stem for said valve head, the latter formed with an axial recess and radial communicating ports that also communicate with the space between the valve head and the wall of the valve body, for providing a passage from said space through the valve head when the latter is upon its seat, and an injector communicating with said recess, said fluid being free to pass through said space around the valve body, and beyond its seat, when the valve head is elevated above the latter, said valve body being provided with an axial outlet tube and a lateral suction inlet.

2. A combination inlet and injector valve, comprising a hollow body having an inlet thereto for pressure fluid, a seat within the latter, a conical valve head of less diameter than the valve body, adapted to engage said seat, an operating stem for said valve head, the latter formed with an axial recess and radial communicating ports that also communicate with the space between the valve head and the wall of the valve body, for providing a passage from said space through the valve head when the latter is upon its seat, and an injector nozzle secured at its inner end within said axial recess of the valve head, said valve head and depending nozzle adapted to be raised by said stem to permit the fluid to pass between them and the seat, said valve body being provided with an axial outlet tube and a lateral suction inlet.

3. The combination with a tube, a hollow valve body fitted thereto, an inlet for said valve body, a seat within the latter, a conical valve head of less diameter than the valve body, adapted to engage said seat, the valve head being formed with an axial recess and radial communicating ports that also communicate with the space between the valve head and the wall of the valve body, for providing a passage from said space through the valve head when the latter is upon its seat, a horizontal inlet secured to the tube, an injector nozzle secured at its inner end within the axial recess of the valve head, the outer end of the injector nozzle being adjacent the inner end of the horizontal inlet within said tube when the valve head is upon its seat, means for raising said valve head above its seat and the injector nozzle above the inner end of the horizontal inlet, to permit the liquid to flow around said valve head into the tube, and a conical outlet throat in the tube, below the horizontal inlet, to retard the flow of liquid from the latter.

ALBERT N. FLORA.